United States Patent Office 2,884,880
Patented May 5, 1959

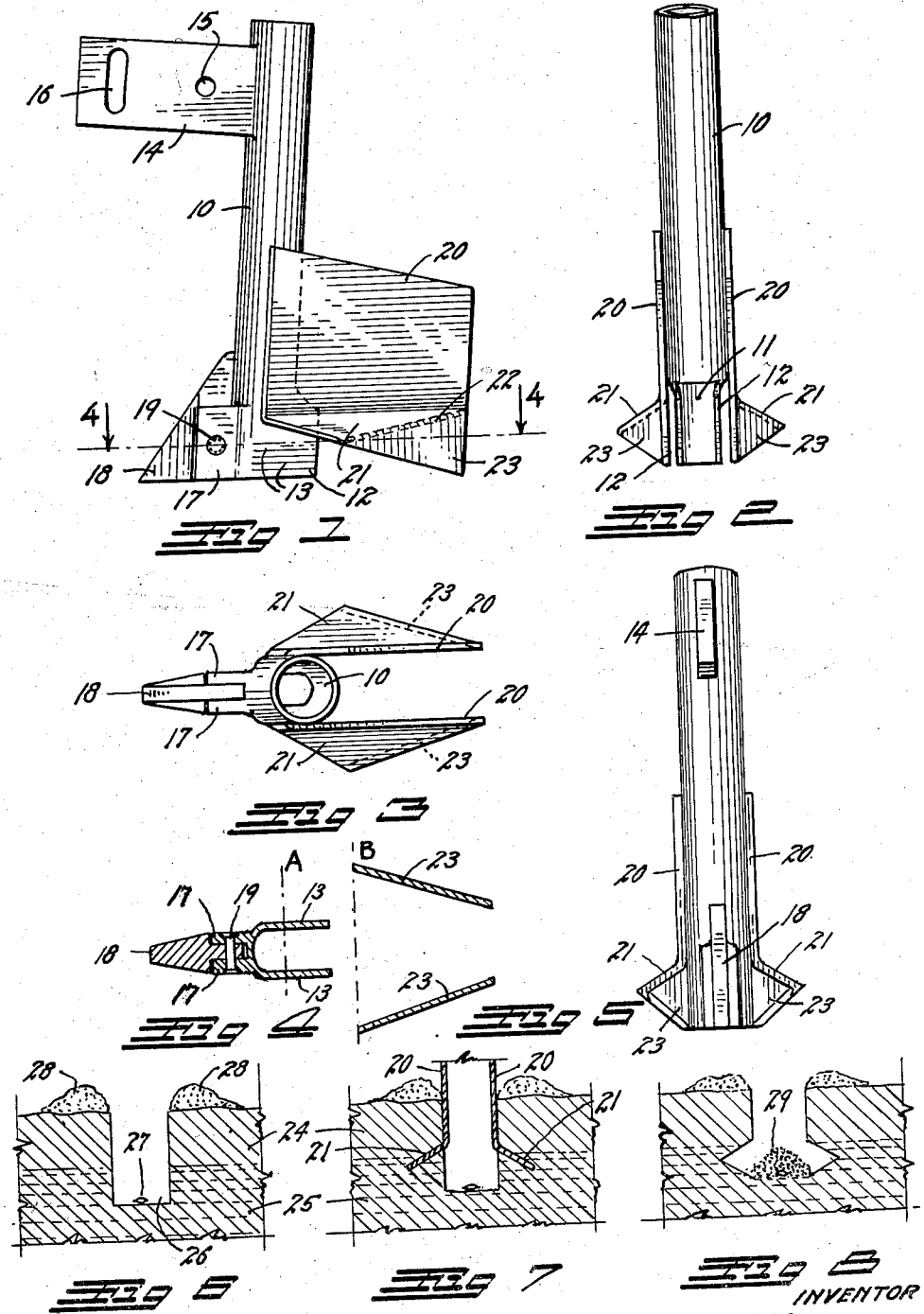

2,884,880

GRAIN DRILL SHOES

Oscar E. Miller, Stratton, Nebr.

Application June 24, 1957, Serial No. 667,489

2 Claims. (Cl. 111—85)

This invention relates to a seed planting shoe for grain drills. Under the modern system of sub-surface tillage of land, the cut stubble and chaff, are left on the surface of the land to reduce water and wind erosion and to lessen the loss of moisture through evaporation. This system of "stubble-mulch" tillage has accomplished its objectives, but the surface debris has made it exceedingly difficult to plant seed. Conventional drill shoes have a surface flaring or spreading action which tends to pack the surface debris between adjacent shoes so that it will pile, drag, and plug up the planter.

One of the objects of this invention is to provide a drill shoe in which the flaring or spreading action will take place below the surface mulch where no debris will be encountered, and which will pass through the surface debris with very little disturbance of the latter.

Present drill shoes are also objectionable in that they plow a surface furrow into which the seed is dropped and then fill and pack this surface furrow with dry surface earth. Under dry farming conditions the dry surface earth around the seed does not contain sufficient moisture to uniformly germinate the planted seeds.

Another object of this invention is to provide a drill shoe which will plow a sub-surface furrow in the moist underpan into which the seed is planted, and which will support the drier surface earth while filling this sub-surface furrow with the removed moist earth so as to completely surround the seed with moist earth before the drier surface earth is allowed to return to the furrow and contact the seed.

A further object is to provide a drill shoe which will not depend upon gravity for covering the seed with moist earth, but which will positively force the moist soil over the seed so that the drill may travel at any desired surface speed.

A still further object is to provide a drill shoe which can be used for shallow planting in irrigated areas without leaving ridges or furrows in the field.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved seed drill shoe;
Fig. 2 is a rear view thereof;
Fig. 3 is a top view thereof;
Fig. 4 is a horizontal section looking downwardly on the line 4—4, Fig. 3;
Fig. 5 is a front view thereof; and
Figs. 6, 7, and 8 are diagrammatic cross-sections through a ground furrow formed by the improved shoe, illustrating various stages of planting at a medium depth.

The improved shoe is built about a substantially vertical, cylindrical seed tube 10. The rear of the seed tube 10 is split at its lower extremity to form a seed discharge opening 11. The two sides of the split are flared rearwardly to form sides 12 on the opening 11, and the lower extremity of the seed tube 10 is flattened to form two flat sides 13 which act as smooth, parallel continuations of the opening sides 12.

A bracket plate 14 is welded to, and extends forwardly from, the upper portion of the seed tube 10. The bracket plate 14 is provided with bolt holes 15 and 16 by means of which the improved shoe may be mounted upon a conventional grain drill so that the seeds to be planted will be dropped into the seed tubes 10. One of the bolt holes 15 provides a pivotal mounting, and the other bolt hole 16 is elongated to allow pivotal movement about the pivot hole 15 for vertical adjustment of the seed tube 10.

Two vertical, parallel, spaced-apart attachment ears 17 are welded or otherwise formed on the leading edge of the lower extremity of the seed tube 10. A renewable plow point 18 is secured in place between the ears 17 by means of a countersunk rivet 19. The point 18 has the shape of a right triangle, with its lower point directed forwardly, and increases in width as its vertical middle is approached, to cover the forward edges of the ears 17 and substantially align with the outer surfaces of the latter.

A relatively flat mold-board plate 20 is welded or otherwise attached to each side of the seed tube 10 adjacent its lower extremity, and these mold-board plates are spaced apart a distance equal to the outer diameter of the seed tube 10, and extend rearwardly in parallel relation.

The lower edge of each mold-board plate is turned outwardly at a downwardly-inclined angle. The forward edge of each outwardly turned portion in inclined rearwardly and outwardly to form a triangular, inclined shelf 21. The rear edge of each triangular shelf 21, indicated at 22, is turned vertically downward to form a vertical, triangular earth sweep 23. The lower edge of each earth sweep 23 is inclined downwardly and rearwardly, forming a continuation of the forward edge of the shelf 21 thereabove, and the rear edge of each triangular earth sweep 23 extends substantially vertical, forming a continuation of the rear edge of the mold-board plate 20 thereabove.

As the shoe is drawn forwardly in a field which has been subjected to stubble-mulch tillage, the flaring shelves will travel beneath the layer of surface debris so as not to disturb the latter. The seed tube 10 and the mold-board plates travel through the stubble-mulch with a minimum of drag and disturbance. Since the mold-board plates increase the width of the seed tube very little, if any, and since there is no flaring or spreading action on the part of the mold-board plates, they add nothing to the drag or resistance to travel of the seed tube, and they do not act to pile debris between adjacent seed tubes.

For the purpose of illustrating the action of the improved shoe, cross-sections of a typical furrow have been indicated diagrammatically in Figs. 6, 7, and 8. In the latter figures the dry top soil (or stubble-mulch top soil) is indicated at 24 and the relatively moist subsoil at 25.

Let us assume the shoe is being drawn forwardly at a planting depth to place the seeds in the sub-soil 25. At the point indicated by the line A in Fig. 4 the plow point will have cut a flat-bottomed seed groove 26 in the subsoil and the flat sides 13 of the seed tube will have pressed the sides of the groove outwardly, and the sides of the seed tube will have pressed the dry soil outwardly to form a narrow furrow, as illustrated in Fig. 6, to receive the seed, indicated at 27. The earth forced from the furrow will form surface piles 28 at each side of the furrow, the size of the piles depending upon the depth of the furrow. These piles and the dry top soil will be prevented from falling into the furrow by the parallel mold-board plates 20.

At the point indicated at the line B in Fig. 4, the relatively sharp forward edges of the triangular shelves 21 will have entered the sub-soil at each side of the seed groove 26 and above the seed 27 to act as a support for the loose dry soil 24, as illustrated in Fig. 7.

The two inwardly-flared, vertical, triangular earth sweeps 23 will now sweep the moist sub-soil, from beneath the shelves 21, inwardly over the seeds 27 to form a windrow 29 of moist sub-soil over the row of seeds, as illustrated in Fig. 8. As the windrow 29 of moist earth is formed over the seeds, the inwardly inclined rear edges 22 of the shelves 21 gradually remove the support from the overhanging loose dry soil 24, and the mold-board plates will remove the support from the furrow sides and from the piles 28 so as to allow the sides and piles to cave inwardly into the furrow over the moist sub-soil windrow 29 so as to restore the normal surface line of the field.

The features which contribute principally to the success of the improved shoe are the flaring shelves 21 which provide positive support for the top soil at each side of the furrow, in combination with the earth sweeps 23 which cut longitudinally-extending notches of sub-soil from the sides of the seed groove and form a windrow of moist sub-soil over the seed row while under the protection of the shelves.

The mold-board plates 20 serve a double function: first, they serve to rigidly support the shelves 21 and the earth sweeps 23; and second, they serve as retaining walls to prevent the top soil and the stubble-mulch from falling into the furrow until the seeds have been completely covered by the moist sub-soil windrow 29.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A seed planting shoe comprising: a substantially vertical seed tube having a seed-discharge passage formed at the rear of its lower extremity; a plow point mounted on the front of the lower extremity of said seed tube to form a seed-receiving furrow; a mold-board plate secured to each side of said seed tube adjacent the bottom thereof, said mold-board plates extending rearwardly in vertical, spaced-apart relation; a pair of triangular shelf plates, each of said shelf plates having its base formed on the lower edge of one of said mold-board plates, with its apex directed laterally outward therefrom so as to form an outwardly and rearwardly extending front edge and an inwardly and rearwardly extending rear edge, said shelf plates being integral with the mold-board plates and joining the latter along a horizontal bend line; and an earth sweep formed integrally with each shelf plate and joining the latter on a bend line along the inwardly and rearwardly extending rear edge thereof, said earth sweeps being substantially vertical, with their bottom edges inclining downwardly as their rear extremities are approached to sweep earth from below said shelf plates inwardly into said furrow.

2. A seed planting shoe as described in claim 1 in which the incline of the lower edges of said earth sweeps corresponds to the incline of said shelf plates, and in which the rear edges of said earth sweeps vertically align with the rear edges of said mold-board plates.

References Cited in the file of this patent

UNITED STATES PATENTS

| | | |
|---|---|---|
| 28,593 | Mitchell | June 5, 1860 |
| 372,755 | Keller | Nov. 8, 1887 |
| 597,396 | Deterding | Jan. 18, 1898 |
| 1,047,816 | Kerian | Dec. 17, 1912 |
| 1,416,331 | Campbell | May 16, 1922 |
| 1,693,318 | Shell | Nov. 27, 1928 |
| 1,987,268 | Roby | Jan. 8, 1935 |
| 2,729,157 | Webb | Jan. 3, 1956 |
| 2,779,263 | Franz et al. | Jan. 29, 1957 |